June 27, 1933.　　H. M. KORETZKY ET AL　　1,915,575
DRY BATTERY
Filed Nov. 19, 1926
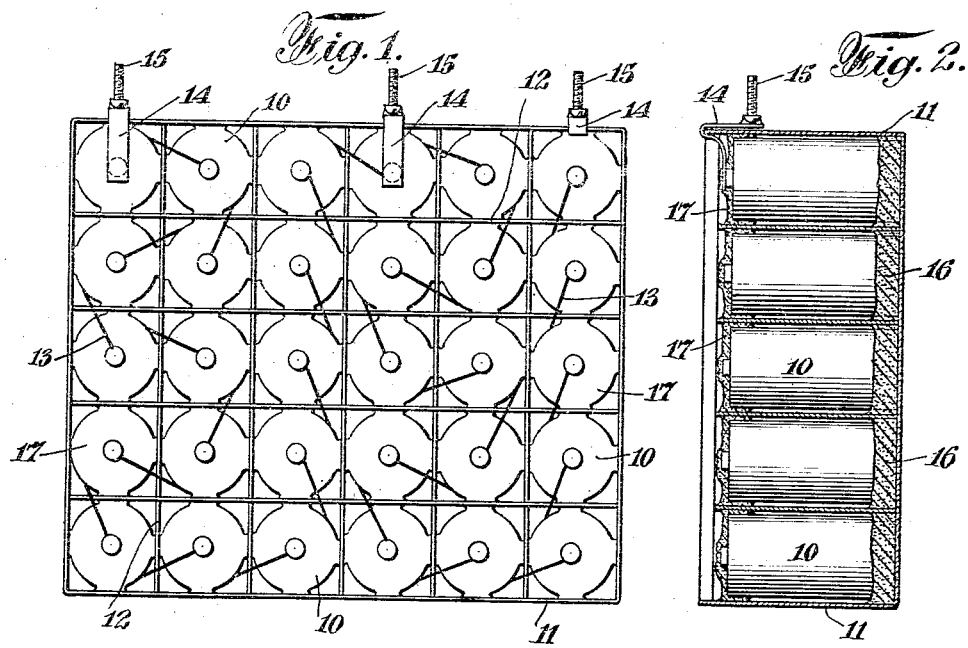
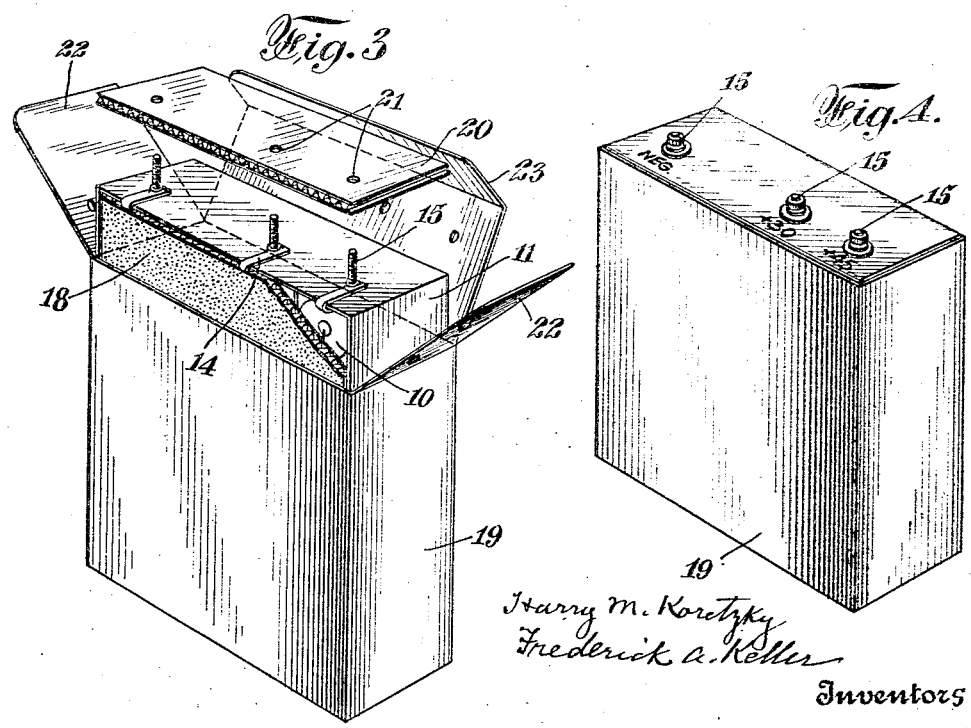
Harry M. Koretzky
Frederick A. Keller
Inventors
By their Attorney H Isnac Kay Patented June 27, 1933

1,915,575

UNITED STATES PATENT OFFICE

HARRY M. KORETZKY, OF HOBOKEN, NEW JERSEY, AND FREDERICK A. KELLER, OF NEW YORK, N. Y., ASSIGNORS TO BRIGHT STAR BATTERY COMPANY, A CORPORATION OF NEW YORK

DRY BATTERY

Application filed November 19, 1926. Serial No. 149,458.

The present invention has relation to an improved form of dry battery and method of making the same. While our invention is applicable to dry batteries for all purposes, it is particularly useful in what are known as "B" batteries, for use in radio receiving sets, and is hereinafter described in this specific connection by way of example.

In the manufacture of "B" batteries as hitherto made, it has been usual to adjust the cells, properly connected electrically, in a suitable box or container, and then to fill the spaces around the cells with pitch or asphaltum, which, on cooling, embeds them firmly so as to prevent all danger of shifting when shipped, whereby the electric connections might be endangered.

The pitch or asphaltum is necessarily poured in very hot and, as it has a high specific heat, it takes a long time to cool, and exerts a strong heating effect upon the cells. Moreover the large mass of pitch necessarily employed is heavy and thus adds materially to the weight of the battery, thus increasing the cost of shipment.

Another disadvantage of the use of pitch in this way is that it has to be poured in a little at a time, to avoid ruining the cells by excessive heat. It is customary to pour in this material in three installments, and it is found necessary to allow about nine hours for each to cool before proceeding to the next step in completion of a battery. There is thus involved a loss of nearly thirty hours for cooling, besides which a great deal of valuable floor space must be devoted to storage of the batteries while cooling. All this has an important effect upon increasing the manufacturing cost of dry batteries.

Our invention saves practically all the time required for cooling, besides making the battery lighter and avoiding all danger of injuring the cells by overheating. Other advantages of our invention will appear hereinafter.

Our invention is illustrated in a preferred form by way of example in the accompanying drawing, wherein Figure 1 is a plan view of the finished battery in the inner box, Figure 2 is a view of the same in cross section, Figure 3 is a perspective view of the complete battery, certain parts being separated for better disclosure, and Figure 4 is a view of the complete closed battery.

In the drawing we have shown a battery of thirty cells, but, of course, any number of cells desired may be employed. These cells 10 are placed as shown within an inner box 11, and we employ partitions 12 placed parallel to the sides of the box, whereby a separate compartment is formed for each cell. The box and partitions are preferably made of pasteboard or the like.

The cells are connected electrically in the usual way, as by wires 13, and the usual leads, 14, are taken out to any desired number of screw terminal posts 15 on one end of the box 11.

In order to secure the cells firmly in place, and insulate, and protect the electrical connections and to prevent their coming loose in shipping and handling, we first pour over the cells an insulating material which is normally solid but liquefies when heated in sufficient quantity to fill the spaces around the cells 10 and partitions 12 up to a level a little above the bottom of the box, as shown at 16 in Figure 2.

We prefer to use sulphur for this purpose, because, it is quite hard and not very brittle when cold, and becomes liquid at a comparatively low temperature. It has a low specific heat so that it cools almost instantly, without endangering the efficiency of the cells and it is cheaper than the material formerly used.

The mass of solid sulphur 16 around the bottoms of the cells adheres to them as well as to the bottom of the box and the partitions, thus protecting and thoroughly uniting and securing all in place.

This first layer of sulphur should be heated to about 120 degrees C. It will be comparatively non-viscous and will cool so rapidly as to save time and not injure the cells.

As soon as this relatively hot and non-viscous melted material has been poured in to form the bottom protective and securing layer 16, the tops of the cells and the electric connections are preferably also secured and protected by a similar but much more viscous meltable material. Here again, sulphur is preferably used, being barely melted by the heat, so that, when poured over the tops of the cells, it cools so rapidly as not to flow any appreciable distance down the sides of the same.

We thereby form protective and securing caps 17 of the cooler and more viscous material, which caps adhere closely to the cells and connections and, at their edges, to the partitions.

It will thus be seen that the cells are firmly held and united both at top and bottom, while, at the same time, the intermediate spaces around the cells being left empty, the battery is much lighter and expensive material is saved. In addition to this the great loss of time and expense of storage space necessitated by former practice are avoided.

The battery as thus constructed may be wrapped or enclosed in any convenient manner, the following being preferred.

Over the entire surface above the cells is laid a corrugated strawboard 18, fitting the box, the outer surface of said board being preferably covered with sodium silicate or other appropriate cementitious material. The inner box, thus covered, is then slipped into an outer folding box 19, the top being protected by a layer of strawboard or the like, 20. This has perforations 21, which fit over the terminals 15. The top of the box 19 has end flaps 22 and a side flap 23, also perforated so that they can be folded over the top end of the inner box with its terminals 15 to make a simple, neat and tight closure as shown in Figure 4.

The sodium silicate or other cement causes the thin pasteboard side of the outer box to adhere to the corrugated board 18 and prevents bulging. If desired, one or more of the surfaces of the inner box itself may also be cemented to the outer box.

This mode of finishing the battery is strong, lasting, inexpensive and light, and it avoids the weight and expense of the outer wax-like sealing ordinarily used in finishing "B" batteries. This wax-like outer seal is not only heavy and expensive, but it frequently gives trouble by cracking.

Various changes may be made in our method and apparatus without departing from the scope of our invention, which is not limited to the details herein shown and described.

What we claim is—

1. A dry cell battery comprising an inner pasteboard box having an open vertical side, horizontal dry cells within said box having their central poles presented at the open side, a layer of sealing material constituted of a crystalloid substance having a relatively low specific heat and a relatively low melting point encasing the bottoms and the tops of said cells but leaving the intermediate portion thereof as a free air space, said substance when melted being of such a character that it does not detrimentally affect the jelly within the cells, a filler-board in the open side of said box, threaded terminals extending upwardly from some of the cells of the upper row, an upper cap provided with perforations through which said terminals extend, and nuts on said terminals.

2. A dry cell battery of the character set forth in claim 1 in which the group of cells are bound together as a unitary block in the box.

3. A dry cell battery of the character set forth in claim 1 in which the assembly mentioned is arranged in a container consisting of a set-up folding box.

4. A dry cell battery of the character set forth in claim 1 in which sulphur constitutes the sealing material.

5. A dry cell battery of the character set forth in claim 1 in which partitions are provided within the box to form separate pockets for individual cells.

6. A dry cell battery of the character set forth in claim 1 in which the assembly mentioned is arranged in a container consisting of a set-up folding box having a flap provided with a hinge extension adapted to be inserted between the side of the box and its contents.

7. A dry cell battery of the character set forth in claim 1 in which the assembly mentioned is arranged in a container consisting of a set-up folding box having a flap provided with a hinge extension adapted to be inserted between the side of the box and its contents and a perforated sheet is fitted over the terminals between the inner box and the outer box flap.

In testimony whereof we have hereunto affixed our signatures on this 30th day of October 1926.

HARRY M. KORETZKY.
FREDERICK A. KELLER.